(12) United States Patent
Saitoh et al.

(10) Patent No.: US 6,899,826 B2
(45) Date of Patent: May 31, 2005

(54) PROCESS FOR PRODUCING FLUORESCENT METAL OXIDE MATERIAL

(75) Inventors: Hidetoshi Saitoh, Nagaoka (JP); Nobuyoshi Nambu, Yokkaichi (JP); Atsushi Nakamura, Yokkaichi (JP)

(73) Assignee: Chubu Chelest Co., Ltd., Osaka (JP)

( * ) Notice: Subject to any disclaimer, the term of this patent is extended or adjusted under 35 U.S.C. 154(b) by 0 days.

(21) Appl. No.: 10/433,090

(22) PCT Filed: Sep. 25, 2001

(86) PCT No.: PCT/JP01/08312
§ 371 (c)(1),
(2), (4) Date: May 30, 2003

(87) PCT Pub. No.: WO02/44303
PCT Pub. Date: Jun. 6, 2002

(65) Prior Publication Data
US 2004/0036059 A1 Feb. 26, 2004

(30) Foreign Application Priority Data
Nov. 30, 2000 (JP) .................................... 2000-366059

(51) Int. Cl.[7] .............................................. C09K 11/77
(52) U.S. Cl. .................... 252/301.4 R; 252/301.4 F; 252/301.4 P; 252/301.5; 252/301.6 R; 252/301.6 P; 252/301.6 F
(58) Field of Search ............... 252/301.4 R, 301.6 R, 252/301.4 P, 301.6 P, 301.4 F, 301.6 F, 301.5

(56) References Cited

U.S. PATENT DOCUMENTS

| 5,545,386 A | 8/1996 | Kaneyoshi |
| 2002/0179922 A1 * | 12/2002 | Andriessen .................. 257/102 |
| 2003/0111644 A1 * | 6/2003 | Chen et al. ........... 252/301.4 R |

FOREIGN PATENT DOCUMENTS

| JP | 11-71103 A | 3/1999 |
| JP | 11-293239 A | 10/1999 |
| JP | 11-322308 A | 11/1999 |
| JP | 2000-212556 A | 8/2000 |
| JP | 2001-163617 A | 6/2001 |
| WO | WO 01/40402 A1 | 6/2001 |

* cited by examiner

Primary Examiner—C. Melissa Koslow
(74) Attorney, Agent, or Firm—Birch, Stewart, Kolasch & Birch, LLP (57) ABSTRACT

A process for producing a metal oxide phosphor includes a step of firing a powder containing an organic metal chelate complex including a plurality of metals constituting the metal oxide at a uniform composition, whereby produced is a metal oxide phosphor having substantially spherical shape with substantially uniform particle size and excellent luminance properties.

5 Claims, 8 Drawing Sheets

(1 of 8 Drawing Sheet(s) Filed in Color)

DIFFRACTION ANGLE (2θ /deg)

FIG. 11

PROCESS FOR PRODUCING FLUORESCENT METAL OXIDE MATERIAL

This application is the national phase under 35 U.S.C. §371 of PCT International Application No. PCT/JP01/08312 which has an International filing date of Sep. 25, 2001, which designated the United States of America.

TECHNICAL FIELD

The present invention relates to a process for producing a metal oxide phosphor having improved controllability in composition, substantially spherical shape and uniform particle size, and an excellent luminance property.

BACKGROUND ART

One of the most conventional processes for producing a metal oxide phosphor is a solid phase method comprising the steps of mixing solid materials such as carbonates or oxides of metals as a raw material for a phosphor at a predetermined composition ratio with respect to the metal, and firing the mixture to yield a multi-element metal oxide. Since this method comprises the step of mixing the raw material powder in solid phase state, the mixture has obviously a non-uniform phase microscopically, and the composition shift is unavoidable, due to generation of a different phase. Further, since the particle size of the resultant metal oxide is relatively large and non-uniform, post-process such as crushing and screening is indispensable to obtain a metal oxide of small particles, resulting in the low yield of the metal oxide. Furthermore, the control of particle size is not so easy as expected.

An exemplary process for adjusting particle size is to add flux prior to firing. According to this process, particle size is adjusted primarily by selecting an appropriate kind and added amount of flux, and the firing temperature. According to such a method, however, control of particle size distribution is almost impossible, although the average particle size of the resultant phosphor is easily adjusted. Further, it is obvious that the metal composition of the metal oxide is inevitably deviated from what it is supposed to be because flux is added to the mixture. Accordingly, control with respect to the composition of the raw material components is cumbersome, and it is highly likely that an excessive component may be precipitated as a different phase.

It is effective to use a raw material of uniform state in order to make the starting material itself uniform for synthesizing. A liquid phase method based on a chemical process, as exemplified by sol-gel method or coprecipitation method, is known as such a method. According to these conventional liquid phase methods, however, even if the solution containing the starting material is uniform, it is inherently inevitable that the resultant substance after the synthesis fails to achieve uniformity in composition, even if attaining fine particulate state, because hydrolysis velocity, solubility product constant, etc. differ depending on the kind of metal compound, and the starting material has to go through hydrolysis, neutralization, precipitation or the like after the step of preparing the solution.

As a measure for solving the above problem, U.S. Pat. No. 3,330,697, and Japanese Unexamined Patent Publication No. 11-181419 has proposed a method comprising the steps of forming metal complexes by reacting metal ions with oxycarboxylic acids or polyamino chelating agent or the like in water, adding a polyol such as ethylene glycol as a cross-linking agent to the metal complexes for esterification polymerization to thereby yield gelatinous complex polymer, and thermally decomposing the complex polymer. In these prior art methods, however, it is highly likely that segregation may occur because metal may leave from the metal complex in the esterification polymerization. Further, a step of crushing fired substance obtained after firing the gelatinous complex polymer is indispensable in order to use the resultant complex polymer as a starting material. The above prior art method makes it difficult to adjust the particle size of the resultant composite oxide in a predetermined range, makes the production process cumbersome, and raises the production cost, which is not desirable in an economical aspect.

Various processes of synthesizing a starting material have been proposed other than the above-mentioned process. However, the conventional processes failed to contribute to practical use in industrial scale because synthesizing steps are complicated and production cost is high. Further, in the currently available process of producing metal oxide powder, it is hardly possible to desirably control the shape and particle size of the metal oxide powder.

Recently, a process for synthesizing ceramics from the metal chelate complex has been developed. This process has been evaluated because it is highly expected that this process can suppress non-uniformity of composition with respect to the metal of the metal oxide. However, an appropriate technique capable of uniformly mixing metal chelate complexes of solid phase in molecular level has not been established. Therefore, it is conceived that significance of using metal chelate complexes has not been sufficiently verified.

In view of the above, it is an object of the present invention to provide a process for industrially advantageously producing a metal oxide phosphor of single phase having substantially spherical shape and substantially uniform particle size, and an excellent luminance property at a remarkably lower temperature, as compared with a conventional process, by using, as a starting material, a raw material powder of substantially uniform particle size with substantially spherical particles and having uniform composition as a mixture in molecular level.

DISCLOSURE OF THE INVENTION

The inventive process for producing a metal oxide phosphor that has accomplished the above objects has a gist in using the powder of the organic metal chelate complex containing a metal or metals constituting the metal oxide in uniform composition and in firing the powder for preparing the metal oxide phosphor.

The metal oxide phosphor producible by the inventive process is obtained as a powder that has substantially spherical shape and substantially uniform particle size. The organic metal chelate complex used in implementing the inventive process is obtained by mixing a metal or a compound thereof, and a chelating agent of the aminocarboxylic type or a metal chelate complex thereof at a predetermined composition ratio based on the metal content of the oxide content to yield a transparent aqueous solution containing the organic metal chelate complex and by subjecting the solution to spray drying.

In implementing the inventive process, it is preferable to use diethylenetriamine pentaacetic acid as the chelating agent of the aminocarboxylic acid type, because the fired substance obtained by firing the organic metal chelate complex powder obtained by using diethylenetriamine pentaacetic acid has large shrinkage in volume to thereby make it possible to produce finer particles of the metal oxide phosphor.

BEST MODE FOR CARRYING OUT THE INVENTION

Examples of the metal oxide phosphor producible by the process of the present invention include: a red phosphor such as $Y_2O_3:Eu^{3+}$, $Y_2O_2S:Eu^{3+}$, $YVO_4:Eu^{3+}$, $(Y, Gd)BO_3:Eu^{3+}$, $MgSiO_3:Mn$, $InBO_4:Eu^{3+}$, $SrTiO_3:Pr$; a blue phosphor such as $BaMgAl_{14}O_{23}:Eu^{2+}$, $CaAl_2O_4:Eu^{2+}$, $Sr_2P_2O_7:Eu^{2+}$, $BaSO_4:Eu^{2+}$, $Y_2SiO_5:Ce^{3+}$, $Ca_2B_5O_9Cl:Eu^{2+}$, $ZnGa_2O_4$; and a green phosphor such as $ZnSiO_4:Mn$, $BaAl_{12}O_{19}:Mn$ $(Ba, Sr, Mg)O \cdot 6Al_2O_3:Mn$, $SrAl_2O_4:Eu^{2+}$, $LaPO_4:(Ce^{3+}, Tb^{3+})$, in addition to $Zn(Ga, Al)_2O_4:Mn$, $Y_3(Al, Ga)_5O_{12}$, $Y_2SiO_5:Tb$.

The present invention has a gist in using the powder of the organic metal chelate complex having a uniform mixture composition as a raw material to produce the metal oxide phosphor having the aforementioned composition. The organic metal chelate complex having a uniform mixture composition is the organic metal chelate complex in which the metal component is mixed uniformly in molecular level. The above chelate complex is obtainable by mixing a metal or a compound thereof, and a chelating agent of the aminocarboxylic type at a predetermined composition ratio based on the metal content of the aimed metal oxide to yield a transparent aqueous solution containing the organic metal chelate complex and by subjecting the solution to spray drying. Particularly preferably used as the chelating agent of the aminocarboxylic type is the chelating agent of the amino carboxylic acid type that does not thermally decompose at a temperature of 200° C. or lower.

In preparing an aqueous solution containing the above chelate complex, particularly, multi-element metal chelate complex, it is preferable to mix a chelating agent of the equivalent not smaller than the equivalent of the metal so that all the metal form a complete complex salt to make the solution transparent. In case of using a metal where the metal ion of the metal chelate complex is subjected to the oxidation by the air to easily turn into the metal oxide or the metal ion having a high valance number in the solution, it is desirable to prevent the oxidation of the metal ion by adding a reductant and/or an antioxidant to the solution containing the organic metal chelate complex in order to further improve the stability of the solution containing the metal chelate complex. For instance, it is effective to stabilize titanium (III) by adding a reductant in case that titanium is used as such a metal.

The powder of the organic metal chelate complex having a uniform mixture composition which is used in the present invention is amorphous, has a uniform composition in molecular level, and has a substantially spherical appearance. As will be clearly described in the Examples in a later section, the powder containing the organic metal chelate complex used in the present invention can be fired at a remarkably lower temperature than what is employed in the conventional process for producing a metal oxide phosphor. Thus, the metal oxide phosphor having substantially spherical shape and uniform particle size can be easily produced by the inventive process.

The present invention is constructed as mentioned above. Specifically, the present invention is directed to a process in which the powder containing the organic metal chelate complex mixed uniformly in molecular level is used as a raw material for synthesizing the powder of the metal oxide phosphor. The amorphous powder containing such a chelate complex can be turned into the metal oxide by firing at a relatively lower temperature, as compared with the conventional process for producing a composite oxide (at a temperature lower than the temperature used in the conventional process by e.g. about 100 to 250°). The obtained powder of the metal oxide has the high degree of the controlled composition, substantially uniform particle size and substantially spherical shape, because of using the powder containing the organic metal chelate complex mixed uniformly in molecular level.

Figure 1:
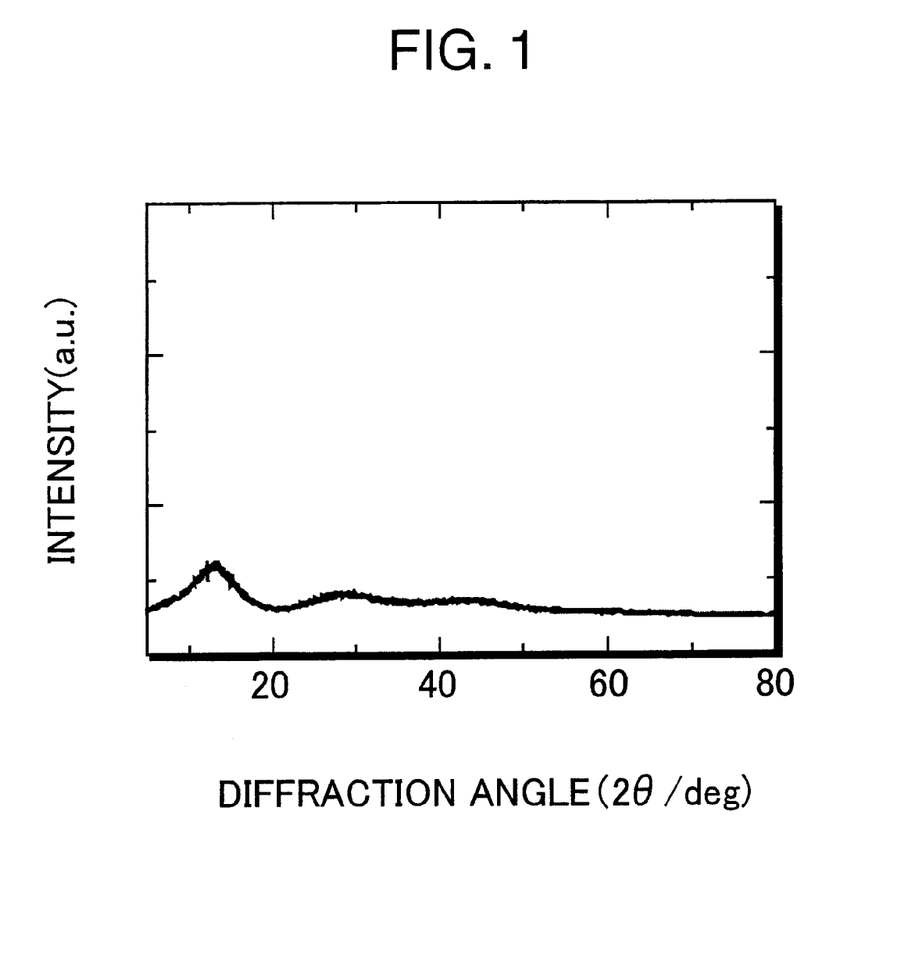
FIG. 1 is a chart illustrating X-ray diffraction of the amorphous powder of the organic metal chelate complex used in preparing a sintered raw material in Example 1.

The powder containing the organic metal chelate complex mixed uniformly in molecular level, which is used as a raw material in the present invention, exhibits a hallo pattern due to the scattering of incident X-ray, as shown in FIG. 1 illustrating a chart showing a result of X-ray analysis, and is non-crystalline in the aspect of crystalline structure. Specifically, since the metal chelate complex in a liquid phase of homogeneous phase is instantaneously dried to a solid phase by spray drying, its homogeneous phase is kept in the solid phase. Thus, even if the metal chelate complex is composed of multi elements, each complex are mixed uniformly in a molecular level, and the resultant metal chelate complex powder becomes non-crystalline in which the molecules are agglomerated without taking a crystalline structure. When the organic metal chelate complex is observed microscopically, it can be said that regularity remaining in the structure differs from structure to structure. However, such regularity is negligibly small as compared with that of a crystalline complex produced by the conventional art. Thus, the organic metal chelate complex used in the present invention is obviously distinguishable over such a crystalline complex.

Figure 2:
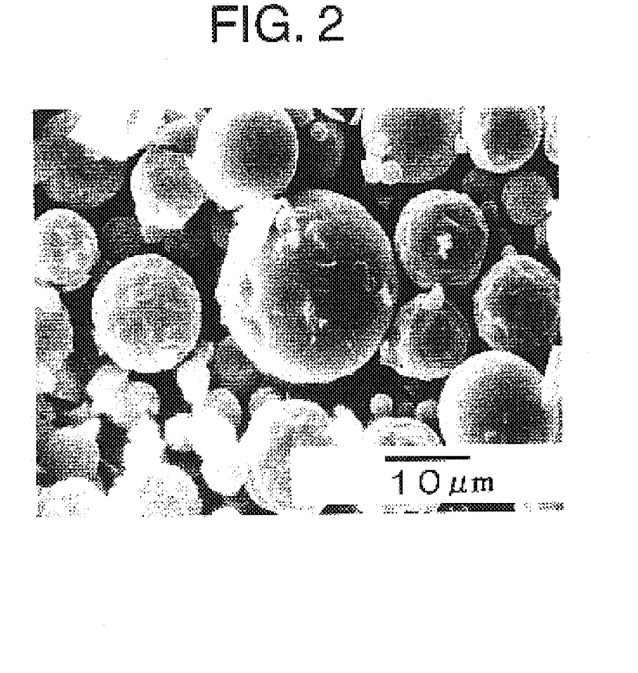
FIG. 2 is a SEM photo of the amorphous powder of the organic metal chelate complex used in preparing the sintered raw material in Example 1.

Further, since the powder of the organic metal chelate complex has the substantially spherical shape and the uniformity particle size as shown in FIG. 2, firing this powder yields the metal oxide phosphor in a state of maintaining the shape before the firing. Accordingly, the control of the conditions to obtain the powder by spray drying allows the adjustment of the shape and the size of the amorphous powder. Alternatively, the choice of an appropriate chelating agent of the aminocarboxylic type also allows the adjustment of the shape of the particle, the particle size and the particle size distribution of the resultant metal oxide phosphor. Particularly, it is preferable to use diethylenetriaminepentaacetic acid as the chelating agent of the aminocarboxylic type, because diethylenetriamine pentaacetic acid can raise shrinkage in volume during firing the powder of the organic metal chelate complex to thereby produce fine particles of the phosphor easily.

Since the metal oxide phosphor produced from the amorphous powder has the substantially spherical form and has no directionality, the present invention is effectively applied in producing the metal oxide phosphor employed in e.g. cathode ray tube (CRT), plasma display (PD), field emission display (FED), fluorescent display tube, and fluorescent lamp.

Next, the process for producing the amorphous powder of the organic metal chelate complex having a uniform mixture composition in molecular level is described in detail.

In producing the powder of the chelate complex, first, a metal or a compound thereof is weighed so that the powder attains a predetermined composition based on the metal content of an aimed metal oxide. Next, the metal or the compound thereof is reacted with the chelating agent of the aminocarboxylic type to yield a transparent aqueous solution containing the organic metal chelate complex. The reaction is carried out in an aqueous medium at a temperature from 20° C. to the boiling point, preferably in the range from 50 to 70° C. The concentration of the aqueous solution ranges preferably from 1 to 30 mass %, more preferably from 10 to 20 mass %, based on solids.

The amount of the chelating agent of the aminocarboxylic type to be used in the inventive process is not specifically limited as far as the amount exceeds the total amount of the metal ions in the aqueous solution. It is, however, preferable to contain the organic chelating agent 1.0 to 1.5 times in terms of mole as much as the total metal ions. In the case where the metal chelate complex or the chelating agent of the aminocarboxylic type does not completely dissolve in the aqueous solution, ammonia, amine, or the like is added to dissolve the ingredients completely in the solution.

By the way, the biggest problem in producing a functional metal oxide is contamination of metal component as impurities. Particularly, sodium salt or potassium salt among the organic metal chelate complexes remains in the phosphor after thermal decomposition, and causes to change the composition of a resultant phosphor. Accordingly, use of such salts should be avoided as much as possible except the case that such salts are intended to be positively contained in the metal oxide phosphor. Further, it is highly recommended that use of an inorganic acid containing chlorine, sulfur, phosphorous or the like, or an inorganic acid salt (such as hydrochloric acid, sulfuric acid, phosphoric acid, or salt thereof), and an organic substance (such as a thiol compound) is prohibited, because of the same reason, except the case that non-metal component such as chlorine, phosphorous, sulfur, boron, and silicon are intended to be positively contained in the metal oxide phosphor. However, since components other than the above (namely, an organic substance free of chlorine, sulfur, phosphorous, etc. nitric acid, nitric acid salt, ammonia, etc.) are decomposed either in the thermal decomposition step or in the firing step, it is acceptable to add an appropriate amount of such components where necessary. It is, however, desirable to add a minimal required amount of such components in view of a possibility that adding an excessive amount of such components may contaminate the resultant phosphor owing to impurities contained in the organic substance.

Preferred examples of the chelating agent of the chelating agent of the aminocarboxylic type used in the present invention are a water-soluble chelating agent of the aminocarboxylic acid type such as ethylenediaminetetraacetic acid, 1,2-cyclohexanediaminetetraacetic acid, dihydroxyethylglycine, diaminopropanoltetraacetic acid, diethylenetriaminepentaacetic acid, ethylenediaminediacetic acid, ethylenediaminedipropionic acid, hydroxyethylenediaminetriacetic acid, glycoletherdiaminetetraacetic acid, hexamethylenediaminetetraacetic acid, ethylenediaminedi(o-hydroxyphenyl)acetic acid, hydroxyethyliminodiacetic acid, iminodiacetic acid, 1,3-diaminopropanetetraacetic acid, 1,2-diaminopropanetetraacetic acid, nitrilotriacetic acid, nitrilotripropionic acid, triethylenetetraminehexaacetic acid, ethylenediaminedisuccic acid, 1,3-diaminopropanedisuccic acid, glutamicacid-N, N-diacetic acid, asparticacid-N,N-diacetic acid. A monomer, an oligomer, or a polymer of these compounds may be usable.

In addition, the organic chelating agent may include a hydroxycarboxylic acid such as gluconic acid, citric acid, tartaric acid, and malic acid. An optimal organic chelating agent in the present invention is the chelating agent of aminocarboxylic acid.

Even in the case where the chelating agent of the aminocarboxylic acid type is used, it is desirable to use a free acid type, ammonium salt, or amine salt and select the most suitable one for the metal or metal compound to be used in the present invention, considering various factors such as chelate formation constant with a metal, the stability of chelate complex, and the solubility of chelate complex in water or alkaline aqueous solution. Further, it is possible to raise the shrinkage ratio during firing by selecting the chelating agent. For instance, it is preferable to use diethylenetriaminepentaacetic acid, because this compound can raise the shrinkage ratio during the firing to thereby make it possible to obtain the fine powder of the metal oxide phosphor.

As the metal used in the present invention, various forms such as carbonate, nitrate, hydride, and oxide can be used. Particularly preferable forms are carbonate, hydride, and oxide free of redundant ions and the like in the aspect of chemical reactivity or after chemical reaction. In the case that the resultant metal oxide phosphor contains non-metal elements such as chlorine, phosphorous, sulfur, boron, and silicon in its composition, it is possible to use chloride, sulfate, phosphate, borate, silicate of the metal(s) in combination with the aforementioned various forms.

In the case where the metal to be used in the present invention is chromium having poor chemical reactivity as a metal, or titanium which does not take the form of carbonate, nitrate, and hydride and which is very stable as an oxide, it is desirable to prepare an aqueous solution containing the organic metal chelate complex by using chloride or sulfate of such a metal and to yield a crystal of the organic chelate complex of high purity by crystallization or its equivalent so that the obtained crystal may be used as a raw material.

There may be a case that it is difficult to obtain the organic metal chelate complex based on metal elements such as silicon, molybdenum, and tungsten, which are stable in the form of oxoacid or the like. In using such a metal element, it is preferable to use the metal in the form of water-soluble inorganic metal compound that is dissolvable in an aqueous medium such as oxoacid (including acidic and alkaline solution) in combination with the organic metal chelate complex so as to produce a powder in the aforementioned step (1). As an approach of admixing the inorganic metal compound, it is possible to add the inorganic metal compound before the stage of forming the organic metal chelate complex depending on a desired metal composition of the resultant metal oxide phosphor. Alternatively, it is also possible to add an appropriate amount of the inorganic metal compound after forming the organic metal chelate complex. After adding the inorganic metal compound, the mixture in which the organic metal chelate complex and the inorganic metal compound are uniformly mixed is turned into an uniform amorphous powder by subjecting the mixture to spray drying.

Further, there is a case that the mixture may become unstable phase in the aqueous solution due to the oxidation resulting from contact of metal ions with air or due to other redox action, even if metal chelate complexes are formed in the aqueous solution. In order to obviate such a phenomenon, it is desirable to prepare an aqueous solution containing the organic metal chelate complex by adding a reductant or antioxident in the step of mixing the component so as to prevent the oxidation of the metal while stabilizing metal ion and, by setting the equivalent of each metal or a compound thereof equal to the equivalent of the chelating agent so that other metal ions that have not bee stabilized can form complex salt to make the solution completely transparent. Examples of the reductant (or antioxident) used in taking such a measure are ascorbic acid, isoascorbic acid, oxalic acid, and hydrazine.

The thus prepared aqueous solution containing the organic metal chelate complex is turned into powdery state by spray drying step which follows the solution preparation step. The running conditions of the spray drying step may be properly controlled based on concentration of the solution, velocity of treating the solution, amount of spray-gas, amount of heated air, or other parameters. The upper limit of the drying temperature may be a highest allowable temperature at which the organic substance does not thermally decompose, and the lower limit thereof may be a lowest allowable temperature at which the organic substance is sufficiently dried. In view of this, a preferred drying temperature range is from 100 to 200° C., and more preferably from 140 to 180° C. Further, considering the drying temperature range, it is desirable to select, as the chelating agent of the aminocarboxylic acid type to be used in the present invention, a chelating agent that does not thermally decompose at least at a drying temperature of 200° C. or lower.

Firing the amorphous powder obtained by the spray drying step yields the metal oxide phosphor of single phase in powdery state. The amorphous powder has high chemical reactivity. Although the firing temperature may depend on the kind of metal oxide, generally, the amorphous powder can be fired at a relatively low temperature such as a temperature ranging from 500 to 800° C. It is not necessary to fire the amorphous powder in the air. Alternatively, it may be possible to fire the amorphous powder in a neutral atmosphere or a reducing atmosphere according to needs.

The thus obtained powder of the metal oxide phosphor of single phase has substantially uniform particle size and substantially spherical shape without directionality. According to the present invention, the powder is obtainable as a spherical particle with a uniform particle size suitable as a phosphor without a process such as a mechanical crushing process (breakdown process) in which e.g. a ball mill is used to regulate particle properties.

As mentioned above, according to the present invention, the powder of the metal oxide phosphor having substantially spherical particles and improved controllability in particle size distribution can be easily produced at a relatively low firing temperature by firing the powder containing the organic metal chelate complex which is uniformly mixed in molecular level, as a starting material for synthesizing a metal oxide phosphor. The thus obtained powder of the phosphor has improved controllability in composition because the raw material is the powder containing the organic metal chelate complex in which the ingredients are uniformly mixed in molecular level. Thus, the present invention provides the powder of the multi-element oxide phosphor having an excellent luminance property.

EXAMPLES

Hereinafter, the present invention will be described in detail by way of Examples, but the following Examples are not intended to limit the present invention, and modifications which do not depart from the spirit and scope of the present invention are embraced in the present invention.

Example 1

Total amount of 700 g including 166.35 g of ethylenediaminetetraacetic acid (0.57 mol) and water was put in a 2-liter beaker, into which 75 g of aqueous ammonia was added and dissolved. Then, 115.44 g of cyttrium carbonate trihydrate (yttrium content: 43.0%) (yttrium: 0.57×0.98 mol) and 2.03 g of europium oxide (europium content: 85.3%) (europium: 0.57×0.02 mol) were gradually added in this order while stirring and heating the mixture at a liquid temperature of 60° C. in such a manner that the mixture may not be spilt over the beaker. Thereafter, the mixture was kept on being stirred for 3 hours at 100° C. until the mixture was completely dissolved at pH 5.0. After the complete dissolution, water was added to make the total weight of the mixture 1,500 g. Thus, obtained was a transparent colorless aqueous solution containing the organic metal chelate complex having the molar ratio in metal Y:Eu=0.98:0.02. Spray drying the above solution at a drying temperature of 160° C., yielded 137 g of metal complex powder of ($Y_2O_3$:Eu).

FIG. 1 is a chart illustrating a result of X-ray diffraction of the metal complex powder. A halo configuration due to scattering of incident X-ray appeared as shown in FIG. 1, which shows that the powder is of amorphous (non-crystalline) state in terms of crystal structure. FIG. 2 is a SEM photo of the powder. It is obvious from the photo in FIG. 2 that the powder has substantially spherical shape with substantially uniform particle size.

Then, the complex powder was fired respectively at 450° C. and 600° C. for 8 hours in an air-releasable electric furnace. As a result of the firing, a powder of the red metal oxide phosphor ($Y_2O_3$:Eu) was obtained.

Comparative Example 1

Powders of oxides of $Y_2O_3$ and $Eu_2O_3$ were weighed so that the composition ratio of the raw material mixture in terms of metal was the same as that in Example 1, and the ingredients were sufficiently mixed in a mortar. Then, the mixture was transferred to an alumina crucible, and fired in the air-releasable electric furnace at 450° C. and 600° C.

respectively for 8 hours. As a result of the firing, powders of $(Y_2O_3:Eu)$ were obtained.

Evaluation Test 1

Figure 3:
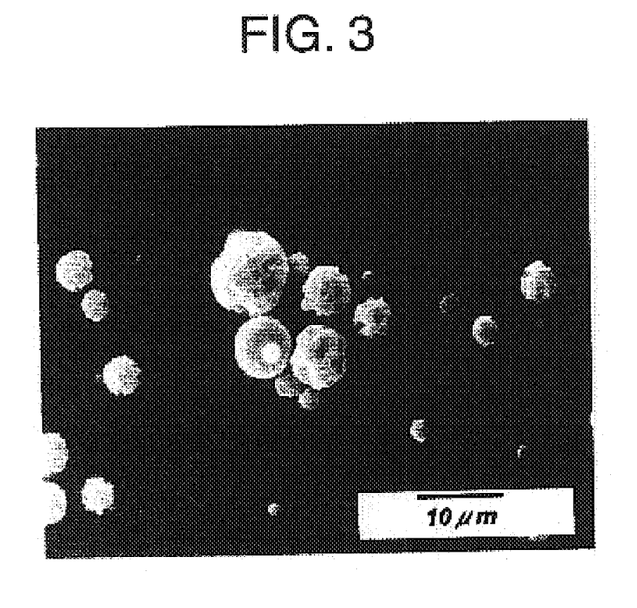
FIG. 3 is a SEM photo of the oxide phosphor obtained in Example 1.
Figure 4:
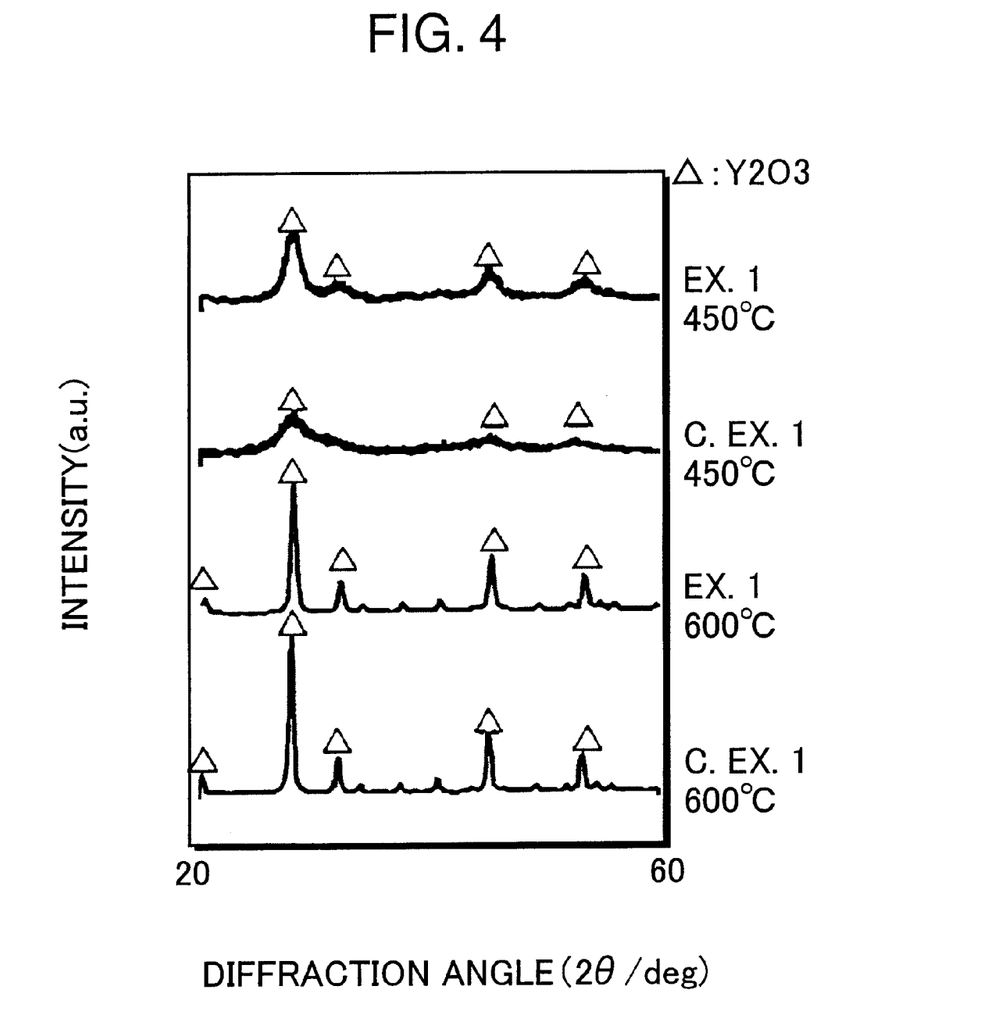
FIG. 4 is a chart illustrating X-ray diffraction of the oxide phosphors obtained in Example 1 and in Comparative Example 1.
Figure 5:
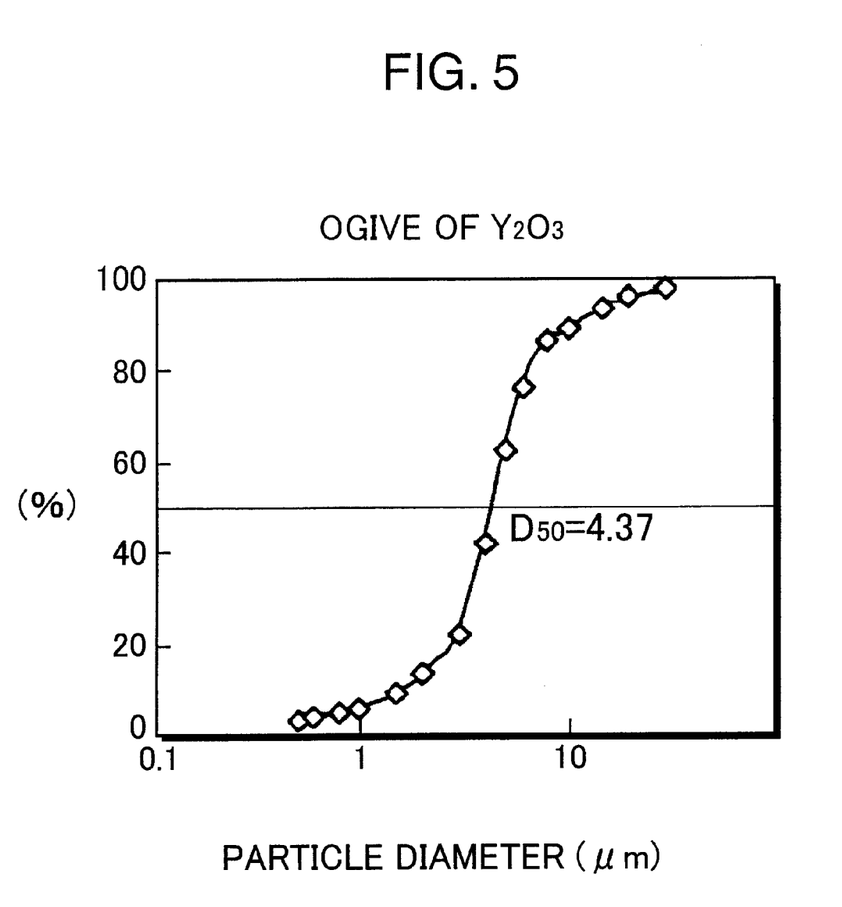
FIG. 5 is a graph illustrating a particle size distribution of the powder of the oxide phosphor obtained in Example 1.

Observation of the SEM photo of FIG. 3 showing the oxide obtained by firing the metal complex powder at 600° C. in Example 1 reveals that the oxide is in the spherical shape, although the particles are somewhat flat at some portion, and that the resultant oxide kept the form of substantially spherical shape of the complex powder used as the raw material. The chart of FIG. 4 illustrating results of X-ray diffraction reveals that a peak with respect to $Y_2O_3$ already appeared at a firing temperature of 450° C. in Example 1. This indicates that the solid solution of $(Y_2O_3:Eu)$ was formed at this stage. FIG. 5 illustrates a particle size distribution of the oxide obtained by firing the powder at 600° C. in Example 1. The measurement of the particle size distribution was carried out by a centrifugal force type particle size distribution analyzer (Shimadzu SA-CP3 manufactured by Shimadzu Corporation). The graph of FIG. 5 reveals that the particle sizes were distributed near the average particle size of 4.4 μm, and that the particle size was substantially uniform.

On the other hand, the powder of the oxide obtained by firing at 600° C. in Comparative Example 1 was in a state of aggregate of particles with several mm in size. The results of X-ray diffraction in FIG. 4 reveal that the peak with respect to $Y_2O_3$ at a firing temperature of 450° C. in Comparative Example 1 was unrecognizably low. Accordingly, it is understood that the solid solution of $(Y_2O_3:Eu)$ was incomplete at 450° C. in Comparative Example 1.

Ultraviolet ray having excitation wavelength of 254 nm was irradiated to the phosphors of $(Y_2O_3:Eu)$ which have been respectively obtained by firing the powders at 600° C. in Example 1 and Comparative Example 1, and luminance of the respective phosphors was measured. As a result of the measurement, it was verified that the phosphor in Example 1 had luminance 1.26 times as high as that in Comparative Example 1.

Example 2

Total amount of 500 g including 21.58 g of ethylenediaminetetraacetic acid (0.074 mol) and water was put in a 1-liter beaker, into which 10 g of aqueous ammonia was added and dissolved. Then, 6.44 g of barium carbonate (barium content: 69.1%) (barium: 0.033 mol), 2.14 g of magnesium hydroxide (magnesium content: 41.1%) (magnesium: 0.036 mol), and 0.645 g of europium oxide (europium content: 85.3%) (europium: 0.0036 mol) were gradually added in this order while stirring and heating the mixture at a liquid temperature of 60° C. in such a manner that the mixture may not be spilt over the beaker. Thereafter, the mixture was kept on being stirred for 1 hour at 80° C. until the mixture was completely dissolved with addition of 6 g of aqueous ammonia. After the complete dissolution, 137.66 g of ethylenediaminetetraacetic acid aluminum-ammonium salt (aluminum content: 7.1%) (aluminum: 0.36 mol) was added until the mixture was completely dissolved at pH 6.7. Thereafter, water was added to the solution to make the total weight of the mixture 1,000 g. Thus, obtained was a transparent colorless aqueous solution containing the organic metal chelate complex having the molar ratio in metal (Ba+Eu):Mg:Al=1:1:10, Ba:Eu=0.9:1.0. Spray drying the solution at a drying temperature of 160° C. yielded 89 g of the metal complex powder of $(BaMgAl_{10}O_{17}:Eu)$.

As a result of X-ray diffraction of the obtained powder, a halo configuration due to scattering of incident X-ray appeared in the similar manner as in Example 1. Thus, it was verified that the powder is of amorphous (non-crystalline) state in terms of crystal structure. Also, the observation of the SEM photo revealed that the powder had substantially spherical shape with substantially uniform particle size. The metal complex powder was fired for 8 hours at 450° C. in the air-releasable electric furnace, and then fired at 600° C. for 8 hours in a reducing atmosphere of $H_2/N_2$. As a result of the firing, the powder of the blue oxide phosphor of $(BaMgAl_{10}O_{17}:Eu)$ was obtained.

Comparative Example 2

Powders of $BaCO_3$, $Mg(OH)_2$, $Al_2O_3$, and $Eu_2O_3$ were weighed so that the composition ratio of the raw material mixture in terms of metal was the same as that in Example 1, and the ingredients were sufficiently mixed in a mortar. Then, the mixture was charged into an alumina crucible, and fired in the air-releasable electric furnace at 450° C. for 8 hours, and then at 600° C. for 8 hours in a reducing atmosphere of $H_2/N_2$. As a result of the firing, powder of $(Al_{10}O_{17}:Eu)$ was obtained.

Comparative Example 3

Powders of $BaCO_3$, $Mg(OH)_2$, $Al_2O_3$, and $Eu_2O_3$ were weighed so that the composition ratio of the raw material mixture in terms of metal was the same as that in Example 2. Aluminum fluoride was added as a flux, and the ingredients were sufficiently mixed in a mortar. Then, the mixture was charged into an alumina crucible, and fired in a reducing atmosphere of $H_2/N_2$ at 1,600° C. for 8 hours. As a result of the firing, powder of $(BaMgAl_{10}O_{17}:Eu)$ was obtained.

Evaluation Test 2

Observation of a SEM photo showing the oxide obtained by firing the powder at 600° C. in Example 2 reveals that the oxide is in the form of substantially spherical shape although the particles are somewhat flat at some portion. This shows that the resultant oxide has kept substantially the same spherical shape as the metal chelate complex as the raw material. Further, the chart illustrating the results of X-ray diffraction reveals that a peak with respect to $BaMgAl_{10}O_{17}$ already appeared at a firing temperature of 450° C. in Example 2. This means that the solid solution of $(BaMgAl_{10}O_{17}:Eu)$ was formed at this stage. Further, it was verified that the particle size distribution of the oxide obtained by firing the powder at 600° C. in Example 2 appeared centrally near the average particle size of 5.48 μm, namely, the substantially uniform particles were obtained around this particle size.

On the other hand, the oxide obtained by firing the powder at 600° C. in Comparative Example 2 was in a state of aggregate of particles with several mm in size. The result of X-ray diffraction reveals that there was no peak with respect to $BaMgAl_{10}O_{17}$ both in the firing temperatures of 450° C. and 600° C. in Comparative Example 2. Accordingly, it was verified that it is impossible to form either a solid solution of $(BaMgAl_{10}O_{17}:Eu)$ or a base material thereof according to the solid-phase method as implemented in Comparative Example 2 even at a firing temperature of 600° C.

Ultraviolet ray having excitation wavelength of 254 nm was irradiated to the powder of the phosphor of $BaMgAl_{10}O_{17}$ obtained by firing the oxide powder at 600° C. in Example 2 and the powder of the phosphor of $BaMgAl_{10}O_{17}$ in Comparative Example 2, and luminance of the respective phosphors was measured. As a result of the measurement, it was verified that the phosphor in Example 2 had luminance 1.28 times as high as that in Comparative Example 2.

Example 3

Total amount of 500 g including 10.02 g of ethylene diaminetetraacetic acid (0.034 mol) and water was put in a 1-liter beaker, into which 5 g of aqueous ammonia was added and dissolved. Then, 6.35 g of barium carbonate (barium content: 69.1%) (barium: 0.032 mol), and 0.213 g of manganese carbonate (manganese content: 43.5%) (manganese: 0.0017 mol) were gradually added in this order while stirring and heating the mixture at a liquid temperature of 60° C. in such a manner that the mixture may not be spilt over the beaker. Then, the mixture was kept on being stirred for 1 hour at 80° C. until the mixture was completely dissolved with addition of 4 g of aqueous ammonia. After the complete dissolution, 153.43 g of ethylenediaminetetraacetic acid aluminum-ammonium salt (aluminum content: 7.1%) (aluminum: 0.404 mol) was added until the mixture was completely dissolved at pH 6.5. Thereafter, water was added to the solution to make the total weight of the mixture 1,000 g. Thus, obtained was a transparent colorless aqueous solution containing the organic metal chelate complex having the molar ratio in metal (Ba+Eu):Al=1:12, Ba:Mn=0.95:0.05. Spray drying the solution at a drying temperature of 160° C. gave 83 g of metal complex powder of $(BaAl_{12}O_{19}:Mn)$.

As a result of X-ray diffraction of the powder, a halo configuration due to scattering of incident X-ray appeared in the similar manner as in Example 1. Thus, it was verified that the powder is of amorphous (non-crystalline) state in terms of crystal structure. Also, the SEM photo revealed that the powder had substantially spherical shape with substantially uniform particle size. The complex powder was fired at 450° C. and 600° C. respectively in the air-releasable electric furnace for 8 hours. Then, the powder of the green oxide phosphor $(BaAl_{12}O_{19}:Mn)$ were obtained.

Comparative Example 4

Powders of $BaCO_3$, $Al_2O_3$, and $MnCO_3$ were weighed so that the composition ratio of the raw material mixture in terms of metal was the same as that in Example 3, and the ingredients were sufficiently mixed in a mortar. Then, the mixture was charged into an alumina crucible, and fired in the air-releasable electric furnace at 450° C. and 600° C. respectively for 8 hours. As a result of the firing, the powder of $(BaAl_{12}O_{19}:Mn)$ were obtained.

Comparative Example 5

Powders of $BaCO_3$, $Al_2O_3$, and $MnCO_3$ were weighed so that the composition ratio of the raw material mixture in terms of metal was the same as that in Example 3. Aluminum fluoride was added as a flux, and the ingredients were sufficiently mixed in a mortar. Then, the mixture was charged into an alumina crucible, and fired in an ambient atmosphere at 1,600° C. for 8 hours. As a result of the firing, powder of $(BaAl_{12}O_{19}:Mn)$ was obtained.

Evaluation Test 3

Observation of a SEM photo showing the oxide obtained by firing the powder at 600° C. in Example 3 reveals that the oxide is in the form of substantially spherical shape although the particles are somewhat flat at some portion. This shows that the resultant oxide has kept substantially the same spherical shape as the metal chelate complex has. Further, the chart illustrating results of X-ray diffraction reveals that a peak with respect to $BaAl_{12}O_{19}$ already appeared at the firing temperature of 450° C. in Example 3. This means that the solid solution of $(BaAl_{12}O_{19}:Mn)$ was formed at this stage. Further, it was verified that the particle size distribution of the oxide obtained by firing the powder at 600° C. in Example 3 appeared centrally near the average particle size of 5.5 $\mu$m, namely, the particle size was substantially uniform.

On the other hand, the oxide obtained by firing the powder at 600° C. in Comparative Example 4 was in a state of aggregate of particles with several mm in size. The result of X-ray diffraction reveals that there was no peak with respect to $BaAl_{12}O_{19}$ both in the firing temperatures of 450° C. and 600° C. in Comparative Example 4. Accordingly, it was verified that it is impossible to form either the solid solution of $(BaAl_{12}O_{19}:Mn)$ or a base material thereof according to the solid-phase method as implemented in Comparative Example 4 even at a firing temperature of 600° C.

Ultraviolet ray having excitation wavelength of 254 nm was irradiated to the phosphor of $BaAl_{12}O_{19}:Mn$ obtained in Example 3 and Comparative Example 5, and luminance of the respective phosphors was measured. As a result of the measurement, it was verified that the phosphor in Example 3 had luminance 1.18 times as high as that in Comparative Example 5.

Example 4

Total amount of 700 g including 114.91 g (0.29 mol) of diethylenetriaminepentaacetic acid (0.074 mol) and water was put in a 1-liter beaker, into which 40 g of aqueous ammonia was added and dissolved. Then, 57.44 g of yttrium carbonate trihydrate (yttrium content: 43.0%) (yttrium: 0.29×0.95 mol), and 2.61 g of europium oxide (europium content: 85.3%) (europium: 0.29×0.05 mol) were gradually added in this order while stirring and heating the mixture at a liquid temperature of 60° C. in such a manner that the mixture may not be spilt over the beaker. Thereafter, the mixture was kept on being stirred for 3 hours at 100° C. until the mixture was completely dissolved at pH 6.0.

After the complete dissolution, water was added to make the total weight of the mixture 1,000 g. Thus, obtained was a transparent colorless aqueous solution containing the organic metal chelate complex having the molar ratio in metal Y:Eu=0.95:0.05. Spray drying the solution at a drying temperature of 160° C. yielded 71 g of metal complex powder of $(Y_2O_3:Eu)$.

Figure 6:
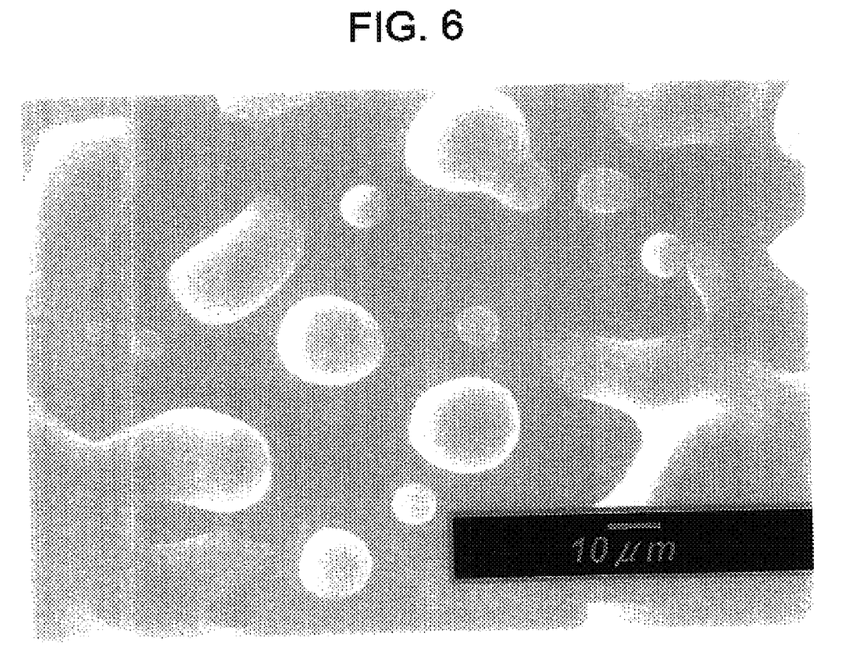
FIG. 6 is a SEM photo of the powder of the organic metal chelate complex used in preparing a sintered raw material in Example 4.

FIG. 6 is a SEM photo of the metal complex powder obtained in Example 4. As is obvious from the photo, the powder has substantially spherical shape with substantially uniform particle size. The complex powder was fired at 1,000° C. for 0.5 hour in the air-releasable electric furnace. As a result of the firing, the red oxide phosphor $(Y_2O_3:Eu)$ was obtained.

Example 5

Total amount of 700 g including 110.9 g (0.38 mol) of ethylenediaminetetraacetic acid (0.38 mol) and water was put in a 1-liter beaker, into which 38 g of aqueous ammonia was added and dissolved. Then, 74.6 g of yttrium carbonate trihydrate (yttrium content: 43.0%) (yttrium: 0.38×0.95 mol), and 3.38 g of europium oxide (europium content: 85.3%) (europium: 0.38×0.05 mol) were gradually added in this order while stirring and heating the mixture at a liquid temperature of 60° C. in such a manner that the mixture may not be spilt over the beaker. Thereafter, the mixture was kept on being stirred for 3 hours at 100° C. until the mixture was completely dissolved at pH: 5.0.

After the complete dissolution, water was added to make the total weight of the mixture 1,000 g. Thus, obtained was a transparent colorless aqueous solution containing the organic metal chelate complex having the molar ratio in metal Y:Eu=0.95:0.05. Spray drying the solution at a drying temperature of 160° C. yielded 84 g of the metal complex powder of ($Y_2O_3$:Eu).

Figure 7:
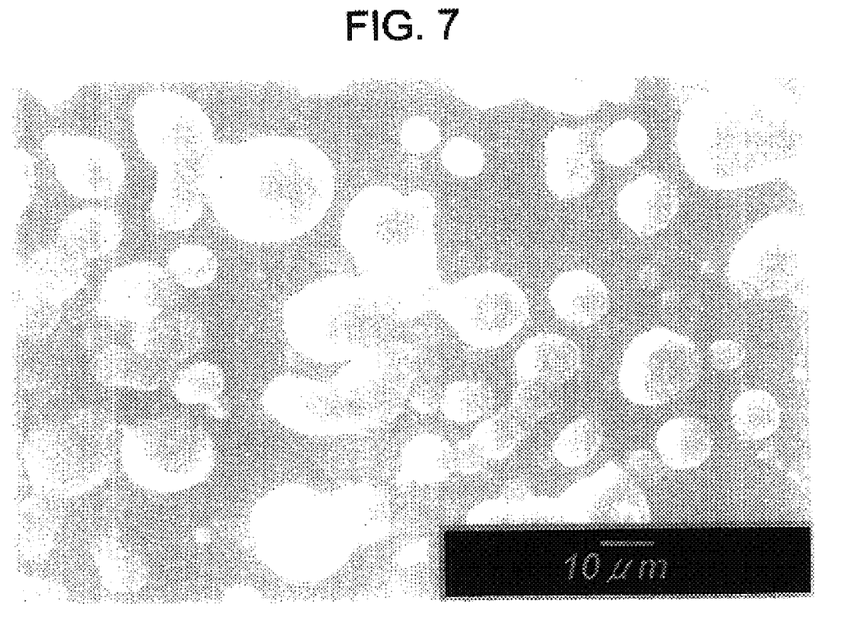
FIG. 7 is a SEM photo of the powder of the organic metal chelate complex used in preparing a sintered raw material in Example 5.

FIG. 7 is a SEM photo of the metal complex powder obtained in Example 5. As is obvious from the photo, the powder has substantially spherical shape with substantially uniform particle size. The complex powder was fired at 1,000° C. for 0.5 hour in the air-releasable electric furnace. Then, the powder of the red oxide phosphor ($Y_2O_3$:Eu) was obtained.

Evaluation Test 4

Figure 8:
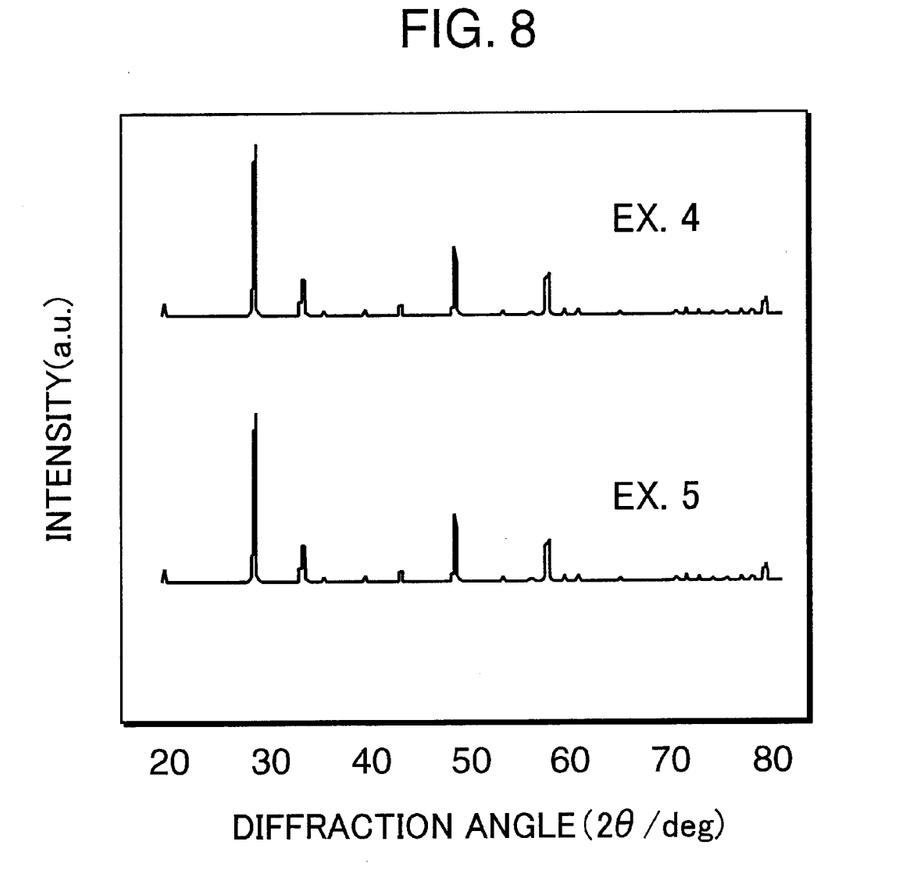
FIG. 8 is a chart illustrating X-ray diffraction of the powder of the oxide phosphor obtained in Examples 4 and 5.

As is obvious from the SEM photos respectively showing the metal complexes obtained in Examples 4 and 5, the respective metal complex powders had substantially the same particle size before firing. Further, FIG. 8 showing the results of X-ray diffraction of the respective oxides obtained in Examples 4 and 5 reveals that the oxides were both solid solutions of $Y_2O_3$:Eu.

Figure 9:
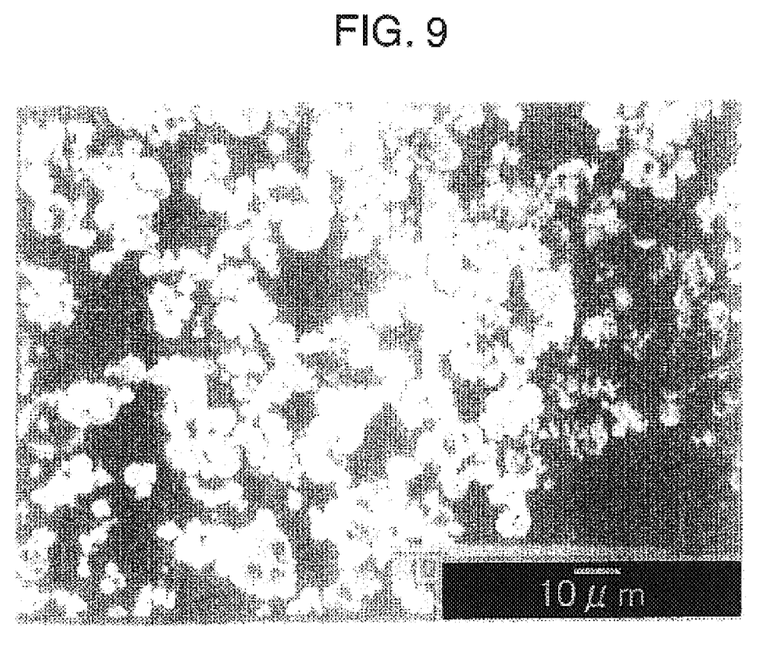
FIG. 9 is a SEM photo of the powder of the oxide phosphor obtained in Example 4.
Figure 10:
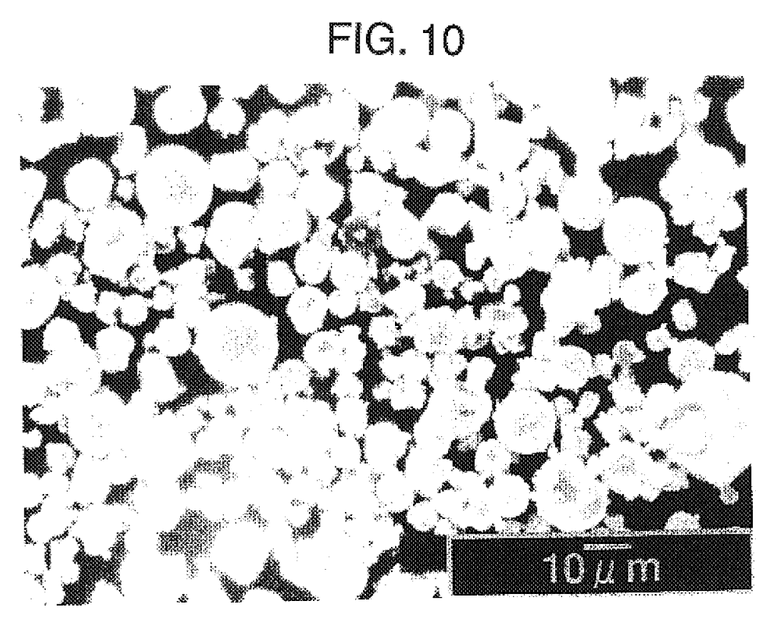
FIG. 10 is a SEM photo of the powder of the oxide phosphor obtained in Example 5.

FIG. 9 is a SEM photo of the oxide powder in Example 4, and FIG. 10 is a SEM photo of the oxide powder in Example 5. As is obvious from these photos, both of the oxide powders in Examples 4 and 5 are of spherical shape with somewhat flat portion at some portion, which reveals that the resultant oxide powders have kept substantially the same spherical shape as the metal chelate complex powders. The oxide powder in Example 4 is slightly smaller in particle size than that in Example 5.

Figure 11:
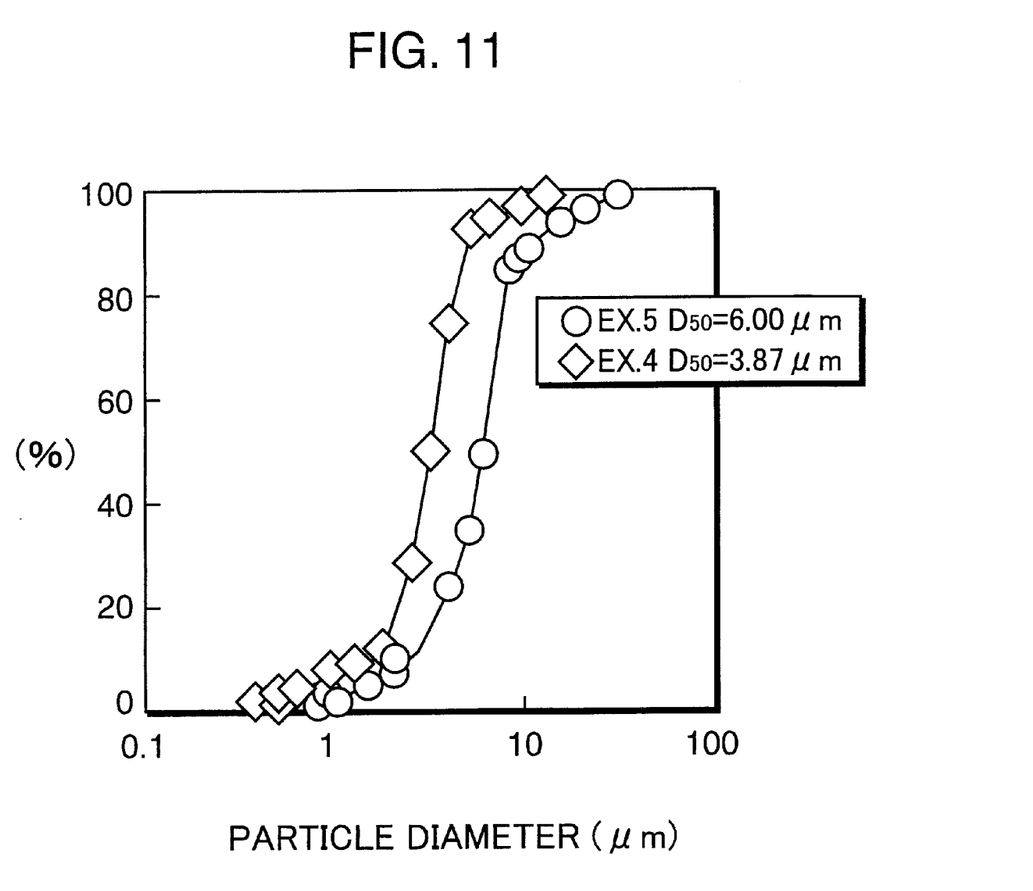
FIG. 11 is a graph illustrating the particle size distribution of the powder of the oxide phosphor obtained in Examples 4 and 5.

FIG. 11 illustrates particle size distributions of the oxide powders in Examples 4 and 5 measured by the centrifugal force type particle size distribution analyzer. Whereas the oxide powder obtained in Example 5 has an average particle diameter of 6.0 $\mu$m, the oxide powder obtained in Example 4 has an average particle diameter of 3.9 $\mu$m. Thus, it was verified that the particle size of the oxide powder obtained in Example 4 was smaller than that in Example 5.

EXPLOITATION IN INDUSTRY

The present invention has been constructed as mentioned above. The present invention provides the oxide phosphor having substantially spherical shape with substantially uniform particle size, uniform composition, and excellent luminance properties by using, as a raw material, a powder having uniform composition as a mixture in molecular level, and having substantially spherical particle shape with substantially uniform particle size. According to the present invention, the oxide phosphor with a single phase and of high density at a lower sintering temperature can be produced efficiently as compared with the conventional process. The inventive oxide phosphor has improved controllability in composition, due to the use of the organic metal chelate complex powder having the improved controllability in composition as a raw material. Since the inventive oxide phosphor is of substantially spherical shape with no directionality as well as having superior luminance property, thereby exhibiting the excellent performance as a metal oxide phosphor used in e.g. cathode ray tubes (CRTs), plasma displays (PDs), field emission displays (FEDs), fluorescent display tubes, fluorescent lamps, etc.

What is claimed is:

1. A process for producing a metal oxide phosphor comprising the steps of:

mixing a metal or a compound thereof and a chelating agent of an aminocarboxylic acid type or metal chelate complex thereof at a predetermined ratio based on the metal content to yield a transparent aqueous solution containing a organic metal chelate complex;

spray drying the aqueous solution to obtain a powder containing an organic metal chelate complex including a plurality of metals constituting the metal oxide at a uniform composition; and firing the powder.

2. The process according to claim 1, wherein said metal oxide phosphor is a powder having a substantially spherical shape with a substantially uniform particle size.

3. The process according to claim 1 or 2, wherein a salt of diethylenetriaminepentaacetic acid is used as the chelating agent of the aminocarboxylic acid type.

4. The process according to claim 1 or 2, wherein a salt of ethylenediaminetetraacetic acid is used as the chelating agent of the aminocarboxylic acid type.

5. The process according to claim 1, wherein said metal oxide phosphor is $Y_2O_3$:Eu.

* * * * *